Oct. 22, 1929.    G. LEACH    1,733,081
CUSHION WHEEL
Original Filed April 4, 1924    2 Sheets-Sheet 1

George Leach

Oct. 22, 1929.                G. LEACH                1,733,081
                             CUSHION WHEEL
                  Original Filed April 4, 1924    2 Sheets-Sheet 2
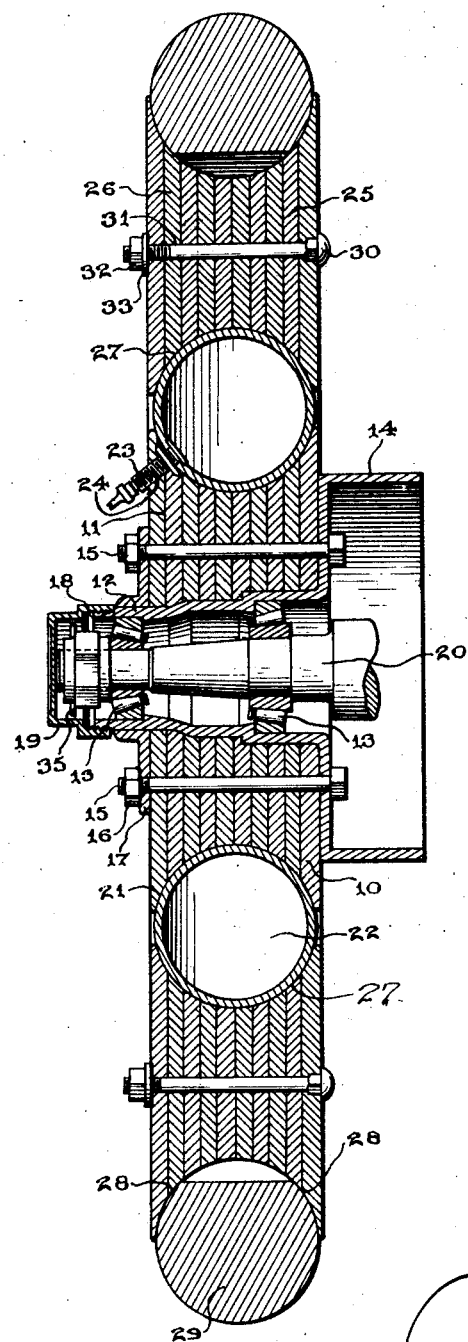
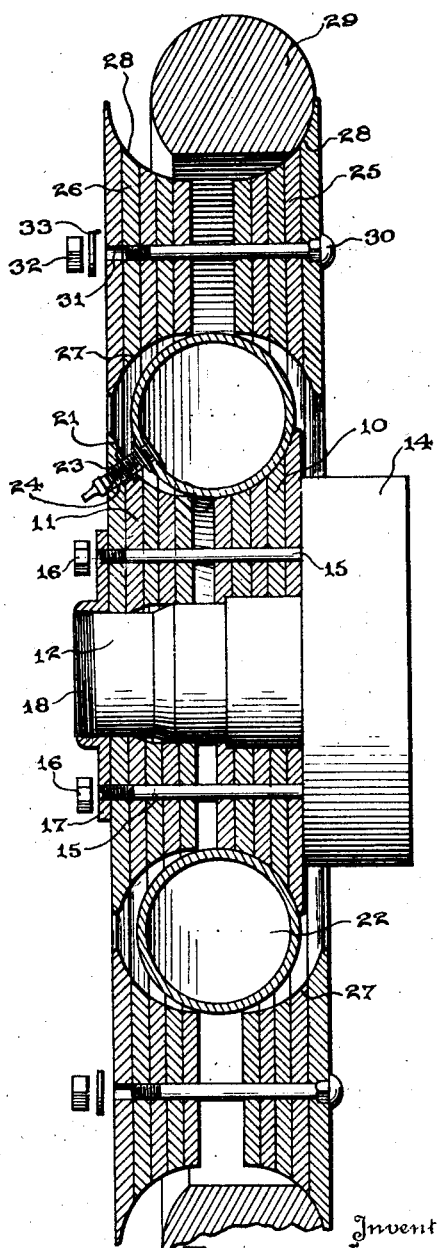
Inventor
George Leach
By Lancaster and A. Devine
Attorneys Patented Oct. 22, 1929

1,733,081

UNITED STATES PATENT OFFICE

GEORGE LEACH, OF BUHL, IDAHO

CUSHION WHEEL

Application filed April 4, 1924, Serial No. 704,219. Renewed September 18, 1929.

The present invention relates to cushioned wheels, and more particularly to a wheel structure having a cushioned hub.

An object of the present invention is to provide a resilient wheel with separable sections at the rim and hub portions of the wheel to admit the quick and easy positioning and removal of the cushion element and the building up or assembling of the wheel.

A further object of the invention is to provide a resilient wheel which is adapted for use with a pneumatic cushion and which is constructed to support and house the cushion and to inter-connect the inner and outer portions of the wheel without interlocking contact to insure a complete cushioning of the outer member upon the inner member.

A still further object of the invention is to provide a wheel the body of which is composed of pairs of complemental sections constituting the inner and outer portions of the wheel and which are recessed or grooved and arranged to register for housing and supporting a pneumatic cushion element between the inner and outer sections of the wheel and to support a suitable tread element at the peripheral portion of the wheel.

The above and various other objects and advantages of this invention will in part be described in, and in part be understood from, the following detailed description of the present preferred embodiment, the same being illustrated in the accompanying drawings, wherein:

Fig. 2 is a vertical cross section taken through the wheel at its axis substantially on the line 2—2 of Fig. 1, and Fig. 3 is a view similar to Fig. 2 but with the various elements partly separated.

Figure 1:
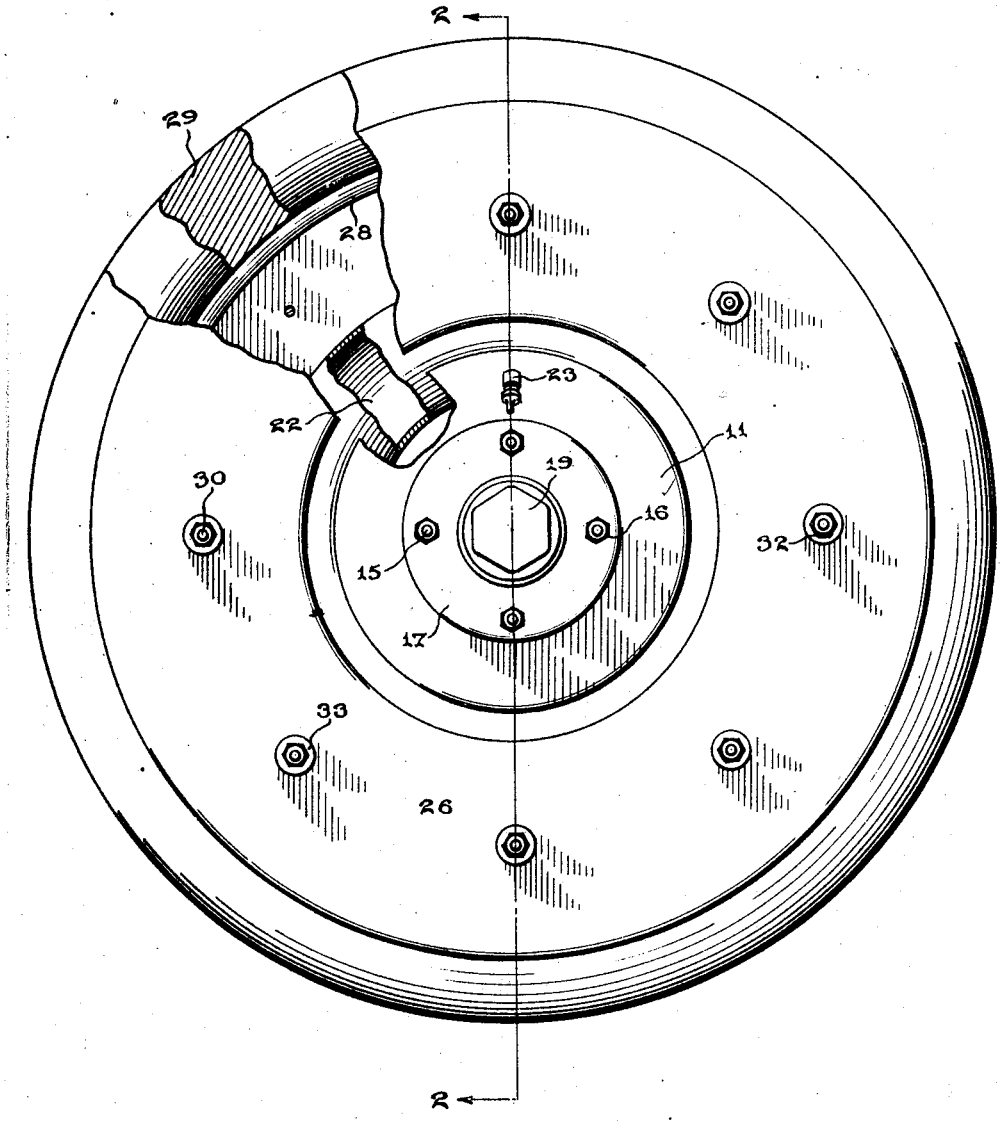
Fig. 1 is a side elevation of a resilient wheel constructed according to the present invention, parts being broken away to show the interior structure.

Referring to the drawings, the wheel comprises an inner hub member composed of the complemental sections 10 and 11 which are adapted to be mounted upon the inner shell 12 of the hub which houses bearings 13, and which may be provided, in the case of a driver, with a brake drum 14 at the inner side of the wheel.

The hub section of the wheel may be of any suitable construction, but in the present instance is disclosed as comprising a plurality of wood laminations for giving strength to the wheel and for preventing warping or straining thereof. The hub section is separable as to its two members and the separation is in the circumferential plane of the wheel as shown in Fig. 3. The portions of the hub are held together by threaded bolts 15 which are passed inwardly through the drum 14 and adjacent hub section 10, the opposite section 11 being slidable on the free ends of the bolts 15 and adapted to be advanced thereover upon the tightening or turning up of nuts 16 which are adapted to be mounted upon the bolts 15. A washer plate 17 is adapted to be fitted over the end of the shell 12 and against the outermost hub section 11 to take up the wear of the nuts 16 and to bind the laminations tightly together and hold the same against lateral strain. The outer end of the shell 12 has external screw threads 18 for receiving a threaded cap 19 thereon after the hub sections 10 and 11 have been clamped together.

The bearings 13 may be of any approved type and are adapted to support the wheel upon an axle spindle 20 of any suitable type.

The peripheral portion of the hub is provided with a peripheral groove, the groove being formed by segmental and complemental grooves 21 which are formed in the facing peripheral portions of the hub sections 10 and 11. These grooves 21 form a groove substantially semicircular in cross section in which is seated a pneumatic tube 22 of annular contour and which is adapted to receive air under pressure from some suitable source for supporting the outer portion of the wheel upon the hub.

The pneumatic tube 22 is provided with a Schraeder valve 23 or the like for receiving and maintaining air within the tube 22. The valve 23 is in the form of an elongated stem and the hub section 11 is provided with a laterally inclined opening 24 which extends from the peripheral groove 21 of the outer section 11 to the outer exposed side thereof so that access may be readily had to the valve 23 for measuring the quantity or pressure of the air from time to time and for facilitating the charging of the tube 22 with air or gas.

The outer section of the wheel comprises a pair of complemental portions 25 and 26 which are provided at their inner edges with complemental grooves 27 adapted to form a groove semi-circular in cross section when the portions 25 and 26 are brought together. The grooves 21 and 27 are adapted to receive, respectively, the inner and outer sides of the tube. By this construction there is little exposure of the tube and sufficient only to provide for the necessary resilience without pinching or otherwise injuring the pneumatic tube.

The outer edges of the outer sections 25 and 26 are also provided with grooves 28 which face toward each other and provide a complete groove or rim semi-circular in cross section at the periphery of the wheel to support a tread member 29. The tread member 29 may be in the form of a solid rubber tire of sufficient diameter to fit snugly in the groove 28 for holding the tire 29 rigidly in the wheel. The sections 25 and 26 of the outer wheel member are provided with bolts 30 which are mounted in the section 25 and which slidably engage in openings 31 formed in the opposite section 26. Nuts 32 are threaded upon the bolts 30 and are provided with washers 33 adapted to fit upon the bolts 30 and protect the outer side of the member 26 against injury incident to the turning up of the nut 32 in drawing the wheel sections 25 and 26 together.

In the assembling of the wheel the pneumatic tube 22 is placed between the parts 10 and 11 of the hub and also between the parts 25 and 26 of the outer wheel section. These pairs of parts are drawn together on their bolts 15 and 30 respectively, and are so shaped as to snugly fit the exterior outer and inner faces of the pneumatic tube 22 and present distortion of the tube. The valve 23 extends outwardly from the hub part 11 a distance sufficient to attach an ordinary air supply tube to the valve, a pressure gauge or the like.

The outer section of the wheel may also be made of wood laminations for the purposes of strength and also to maintain the same from warping or distortion. The hub cap 19 may be threaded upon the end 18 of the hub shell after the hub parts are drawn together and the cap 19 may house a suitable key 35 for locking the hub to the spindle 20 of the axle.

The above specifically described embodiment of this invention may be modified and changed to meet various conditions of manufacture and use, and such changes and modifications are restricted only by the scope of the following claim.

What is claimed is:

In a wheel construction, a hub portion embodying a shell provided with a shoulder at its inner end, complemental solid hub sections separable in the circumferential plane of the wheel slidable over the shell into surface contact throughout with the shell and formed with segmental and complemental grooves providing a groove in the peripheral face of the hub sections of semi-circular formation in cross section, a pneumatic tube of circular formation in cross section, mounted in the peripheral groove, and means extending through said hub portion and connected to said shoulder for separably clamping said complemental hub sections together and to said shoulder, and retaining the pneumatic tube within said peripheral groove.

GEORGE LEACH.